Aug. 2, 1966
P. R. KONZ
3,264,056
METHOD OF GAS PURIFICATION AND REMOVAL OF
FERROUS CARBONATE FROM THE
ABSORPTION SOLUTION
Filed June 10, 1965
3 Sheets-Sheet 2
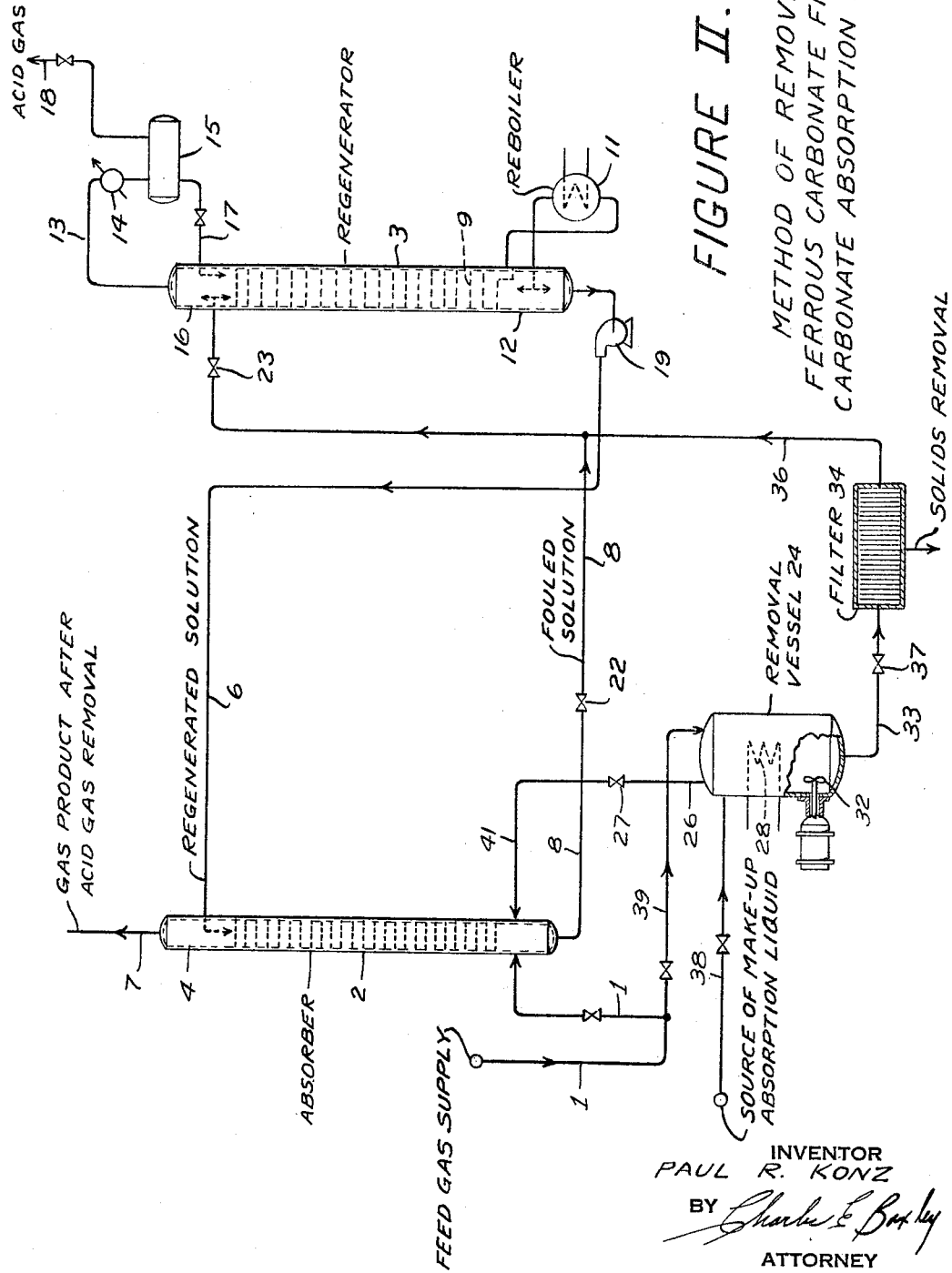
FIGURE II.
METHOD OF REMOVING
FERROUS CARBONATE FROM A
CARBONATE ABSORPTION SYSTEM
INVENTOR
PAUL R. KONZ
BY Charles E. Baxley
ATTORNEY

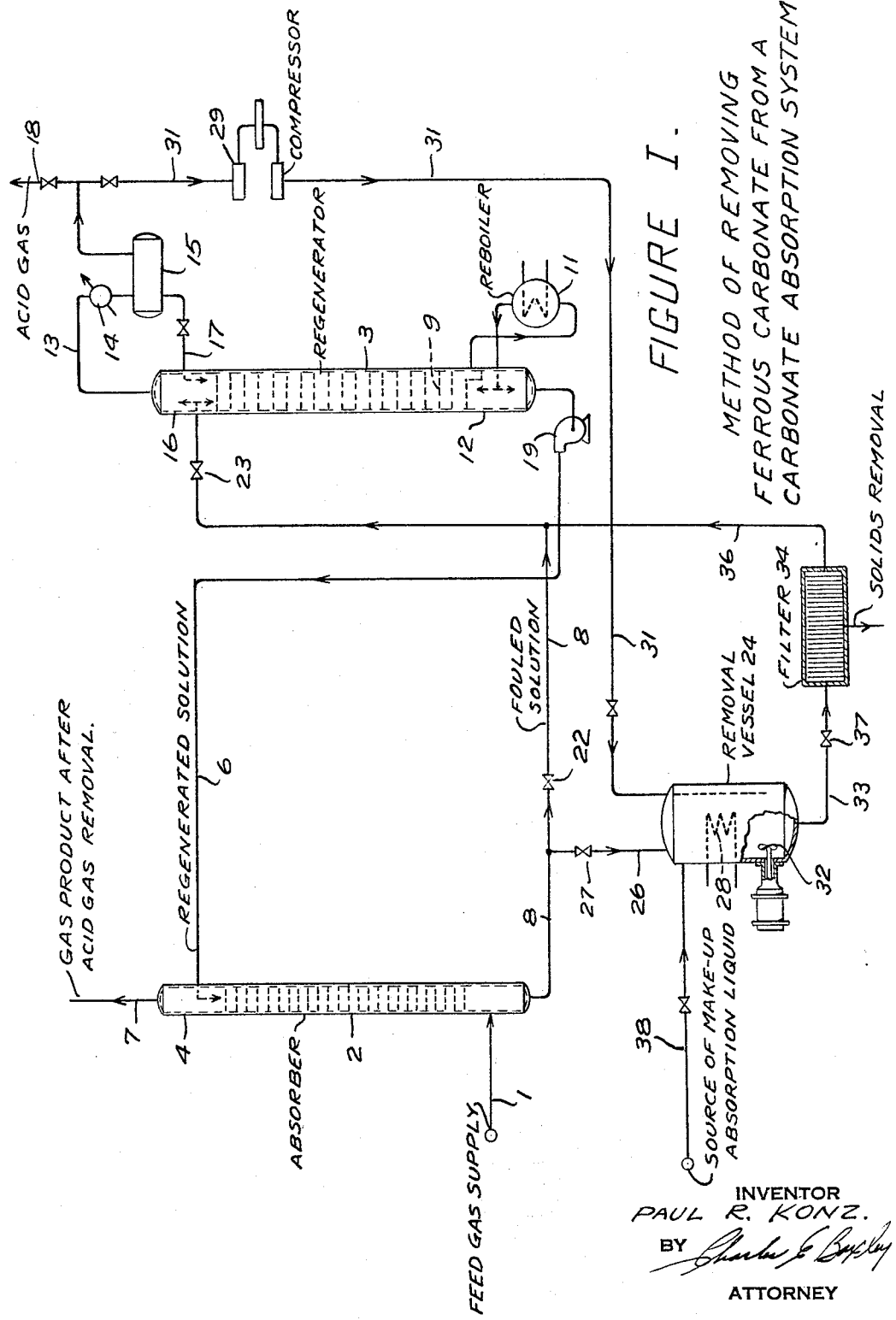

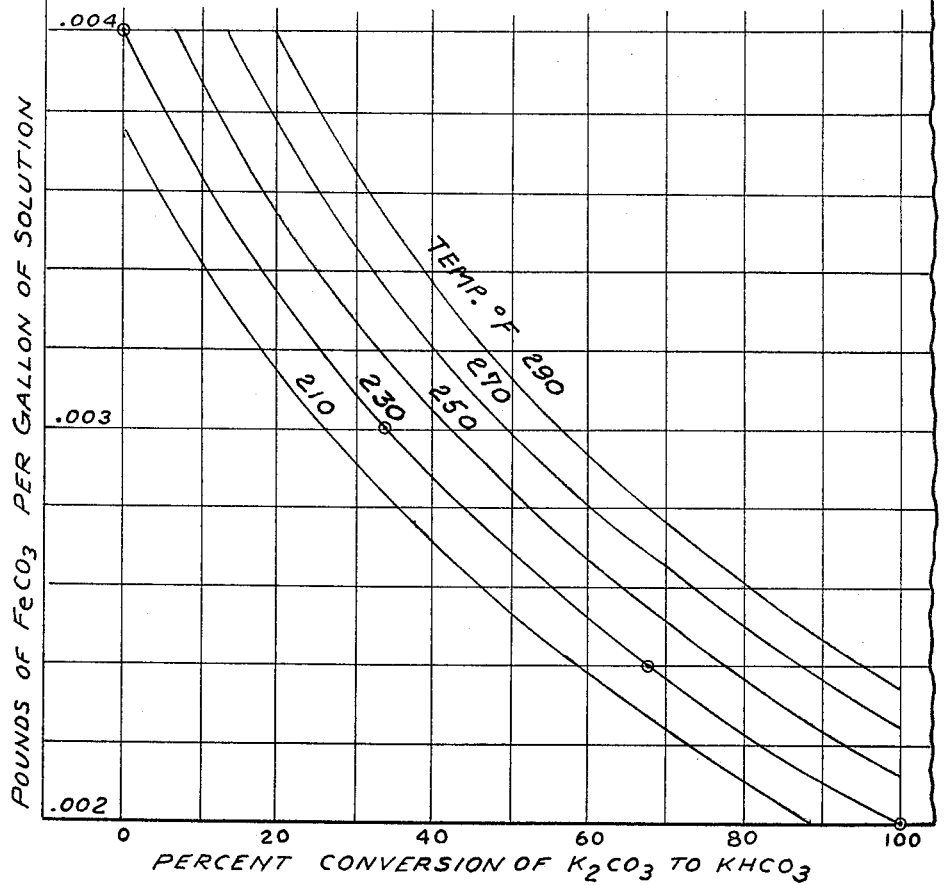
FIGURE III.

3,264,056
METHOD OF GAS PURIFICATION AND REMOVAL OF FERROUS CARBONATE FROM THE ABSORPTION SOLUTION
Paul R. Konz, Newark, N.J., assignor to Foster Wheeler Corporation, New York, N.Y., a corporation of New York
Filed June 10, 1965, Ser. No. 462,997
13 Claims. (Cl. 23—2)

This application is a continuation-in-part of application Serial No. 178,449, filed by Paul R. Konz, March 8, 1962, now abandoned.

This invention relates to the removal of carbon dioxide and hydrogen sulfide from gas mixtures containing either or both of these acid gases. More particularly, it is a means for preventing plugging of equipment employed in acid gas removal.

It is known that carbon dioxide and hydrogen sulfide can be absorbed from a gas mixture by contact with organic carbonates or aqueous solutions of an alkali metal carbonate.

An aqueous potassium carbonate solution is the preferred absorption liquid. Temperatures in the vicinity of the atmospheric boiling point of the solution are also preferred. This temperature preference is based upon the discovery by the United States Bureau of Mines that liquids capable of absorbing $CO_2$ and $H_2S$ and of being regenerated at elevated temperatures will effectively absorb $CO_2$ and $H_2S$ at temperatures in the vicinity of the atmospheric boiling temperature of the liquid, provided the absorption zone is maintained under a superatmospheric pressure.

In the so called "hot potassium carbonate process," absorbtion liquid may be charged with either potassium carbonate or potassium hydroxide and becomes an aqueous solution of both potassium carbonate and potassium bicarbonate. Carbon dioxide or hydrogen sulfide or a combination of both in a gas stream will react with the absorption liquid, as it contacts the gas stream in an absorption zone, to increase the potassium bicarbonate concentration following the formulae:

$$K_2CO_3 + H_2O + CO_2 \rightarrow 2KHCO_3$$

$$K_2CO_3 + H_2S \rightarrow KHCO_3 + KHS$$

Effluent from the absorption zone has a major portion (usually from 50 to 80 percent) of the carbonate converted to bicarbonate and is called "fouled solution." The foulded solution is passed to a regenerator zone where acid gas is desorbed from the solution to leave a major portion (from 50 to 80 perecent) of potassium carbonate. Regenerated liquid is then coursed downward through the absorption zone to complete the cycle.

One of the difficulties encountered in carbonate absorption of acid gases is the plugging of absorbers.

Insight into this plugging phenomenon was gained in progressive steps. The plugging substance was soon found to be ferrous carbonate. It is generally agreed that iron $+$ enters the system by the corrosion of steel equipment.

Observation of deposit characteristics on operating absorption systems revealed that clogging was most severe on the bottom trays of absorbers. It was also discovered that deposition reduced progressively up these absorbers to the extent that top trays were completely free of cloggin. Variation of environmental parameters in the field focussed attention on carbonate-bicarbonate ion concentration.

In concurrent laboratory work, solubility experiments showed that under simiulated field conditions ferrous carbonate is about one-half as soluble in a bicarbonate solution as it is in a carbonate solution. For carbonate-bicarbonate solution mixtures the trend of solubility was found to decrease directly with the bicarbonate to carbonate ratio.

Relating the laboratory results to field conditions verified the theory that in the path of a carbonate absorption liquid down an absorber, bicarbonate ion concentration reaches a level at which ferrous carbonate plates out of an aqueous solution. Broader inquiry into environmental conditions and their effects on acid gas absorption systems further advanced bicarbonate ion concentration as the key control for ferrous carbonate removal.

The foregoing probably appears straight and sure by hindlight. There is a temptation of gloss over failures encountered in this development. In one installation, perforated trays in the bottom of an absorber rapidly became sealed. The precipitate was the same hard, erosion-resistant, adhering, ferrous carbonate scale encountered in other absorbers. These perforated trays were replaced by higher capacity bubble-cap trays at no small expense. With attendant grief it was discovered that the bubble caps also quickly clogged. Ferrous carbonate scale apparently concentrates at tray openings to plug an absorber. Again in restrospect this plugging can be explained by acid gas bubbling through tray openings with local flow agitation giving rise to increased local bicarbonate ion concentration. Whatever the cause of this plugging, its ultimate result is clear. Large quantities of ferrous carbonate are not required to plug an absorber tray and geometry changes offer limited relief. Ferrous carbonate scale hunts tray openings. Even where organic carbonates are used as the absorption liquid, acid gases together with water from the gas stream causes corrosion of steel lines and trays thereby introducing ferrous carbonate in an aqueous solution as an impurity in the absorption liquid. Accordingly, ferrous carbonate plugging occurs in various degrees of severity throughout the different varities of carbonate absorption systems for removing $CO_2$ or $H_2S$, and regardless of whether the metal radical of the carbonate is organic or inorganic.

The present advance solves ferrous carbonate plugging in a novel and, facile manner. Conditions which give rise to plugging are inevitably present, so these same conditions are used to concentrate and localize precipitation of ferrous carbonate for convenient removal. This invention contemplates the provision of a convenient removal zone apart from the absorption zone and the regeneration zone and wherein the bicarbonate concentration of the absorption liquid is raised high enough to accomplish ferrous carbonate precipitation therein. The precipitate is separated from the absorption liquid by physical means.

Basically, this improvement eliminates a major cause of shut-down.

This teaching is particularly advantageous for the hot potassium carbonate process. Low heat requirement imparted commercial desirability to that process. The present inexpensive answer to ferrous carbonate plugging gives hot potassium carbonate full commercial acceptability.

These and other advantages will appear more fully from the accompanying flow diagrams which illustrate the application of the invention to a hot potassium carbonate system and wherein:

FIGURE I illustrates the addition of acid gas product to the removal vessel from the effluent of the regenerator.

FIGURE II illustrates the addition of acid gas from the gas feed upstream of the absorber.

FIGURE III is a graph giving data on solubility of ferrous carbonate ($FeCO_3$) in $K_2CO_3$-$KHCO_3$ solutions.

In the shown embodiment a gas stream, from which carbon dioxide or hydrogen sulfide or mixtures thereof are to be removed, is introduced via line 1 into the bottom of absorber 2. The absorber may be any suitable type of countercurrent scrubbing tower capable of producing intimate contact between the absorption liquid and the gas mixture. For example, the absorber may be equipped with perforated trays as shown, bubble trays, or a suitable packing. Absorber 2 is maintained under a superatmospheric pressure of at least 50 lbs./sq. in. gage and preferably more than 100 lbs./sq. in. gage. The gas mixture supplied through line 1 must, of course, be at column pressure.

Hot regenerated absorption liquid from regenerator 3 is introduced into top 4 of absorber 2 through line 6. The liquid enters top 4 at a temperature not substantially less than the temperature of a liquid leaving regenerator 3; i.e., a temperature in the neighborhood of the atmospheric boiling temperature of the liquid. The hot liquid courses downwardly through absorber 2 countercurrent to the rising gas stream. During this countercurrent contact, carbon dioxide or hydrogen sulfide or both present in the gas stream are absorbed by the liquid. The gas stream, containing a decreased concentration of acid gases exits via top 4 of the absorber by line 7.

As part of the basic hot potassium process, fouled liquid is conducted through line 8 to regenerator 3 shown as a stripping column equipped with perforated trays 9. The regenerator could also be equipped with bubble trays or packing in like manner to the absorber. A reboiler 11 is provided at bottom 12 of the regenerator. By means of heat supplied through reboiler 11, liquid at bottom 12 is brought to its boiling point, and the produced steam rises through the liquid flowing downward through the regenerator.

As a result of the simultaneous flashing, boiling and steam stripping to which the liquid is subjected in regenerator 3, acid gas is desorbed, and a mixture of steam and desorbed gas leaves the top of the regenerator by line 13. This mixture is conducted to condenser 14 where the steam is condensed. Condensate is collected in reflux drum 15 and is returned to top 16 of the regenerator by line 17. Effluent from reflux drum 15, containing a high concentration of carbon dioxide or hydrogen sulfide or both, is removed by line 18.

Hot regenerated absorption liquid leaves bottom 12 of regenerator 3 by line 6 and is recycled to the absorber by means of pump 19, preferably without any deliberate cooling. When there is no deliberate cooling of the regenerated liquid between the regenerator and the absorber, there is practically no loss in sensible heat between the two apparati. However, in some special cases the absorption liquid is deliberately cooled a small amount: for example 5° F. or 10° F., but not more than 20° F.

The greatest advantages of the hot potassium carbonate process are obtained by using concentrated aqueous solutions as the absorption liquid. Potassium carbonate-bicarbonate mixtures are only moderately soluble at atmospheric temperatures to about 3 N. However, at temperatures in the neighborhood of the atmospheric boiling point of the liquid, potassium carbonate and mixtures thereof with potassium bicarbonate are much more soluble. Aqueous solutions having potassium normalities of from 6 to 14 and preferably normalities of from 8 to 11, will usually be employed as the absorption liquid.

Potassium carbonate solutions suffer no appreciable losses due to volatilization, which is a costly problem in the ethanolamine scrubbing process.

As mentioned previously, elevated pressures of at least 50 pounds per square inch gage and preferably pressures about 100 pounds per square inch gage are necessary in the absorber. Elevated pressures are necessary for two reasons: first, to insure relatively high partial pressures of carbon dioxide or hydrogen sulfide in the gas mixture, and secondly, to suppress vaporization losses of the liquid in the absorber. At pressures below about 50 pounds per square inch, excessive volatilization of the liquid would occur with attendant heat losses.

Regeneration of the fouled liquid leaving the absorber should be conducted at a temperature in the vicinity of the atmospheric boiling temperature of the absorption liquid, preferably above 220° F., and not in any case below 220° F. High temperatures are required for economical steam consumption. Furthermore at lower temperatures, decomposition is not carried close enough to completion.

In the shown embodiment, as fouled solution from absorber 2 passes to regenerator 3, reduction in pressure should be substantial so that the partial pressure of carbon dioxide or hydrogen sulfide over the solution in the regenerator is considerably less than what it was in the absorber. Means for pressure reduction, such as for example valves 22 and 23, are well known to those skilled in fluid mechanics. The final pressure in the regenerator is atmospheric or slightly above atmospheric: for example, from 5 to 30 pounds per square inch gage.

Upon pressure letdown, a certain amount of the absorbed gas will flash off immediately from the liquid solely by virtue of the reduced pressure. The evolution of the absorbed gas will be accompanied by the evolution of considerable quantities of steam. Although in isolated instances the amount of desorption which results merely from reducing the pressure on the liquid may be sufficient, in the great majority of cases a stripping operation is necessary to reduce the residual content of the absorbed gas to a sufficiently low level.

Operating data for a typical plant is described in Petroleum Refiner, vol. 37, No. 12, December 1958, pages 123–128, in an article entitled, "How $CO_2$ Removal Plants Are Working," by Robert O. Palo and John B. Armstrong. Table 1 contains typical data on the conversion of $K_2CO_3$ to $KHCO_3$ taken from this article.

TABLE I

|  | 1 | 2 | 3 |
|---|---|---|---|
| Initial Concentration of $K_2CO_3$ at Start-Up | 20.5 | 21.8 | 21.3 |
| Rich Sol'n Percent Conver. at Absorber Exit | 66.5 | 63.5 | 75.3 |
| Lean Sol'n Percent Conver. at Absorber Inlet | 40.3 | 36.3 | 38.4 |

It is not unreasonable to assume that, as an example in the embodiment of FIG. 1, the $K_2CO_3$ of the spent solution from the absorber (in line 8 of FIG. 1) will be 60% converted, from about 40% conversion at the top, with initially a 20 weight percent $K_2CO_3$ solution.

In accordance with the invention, ferrous carbonate precipitation is localized in a removal zone, shown as vessel 24. Generally the absorption liquid is introduced into the removal vessel at a relatively high bicarbonate concentration. In the shown embodiments a slip stream is taken from line 8 via line 26.

The portion of absorption liquid diverted to removal vessel 24 depends upon the degree of ferrous carbonate fouling anticipated. In a hot potassium system of conventional construction from 1 to 3 percent of the absorption liquid flow and not more than a 5 percent slip stream to the removal vessel would be expected.

To prevent flashing in vessel 24 it is preferred that the pressure be maintained as close as possible to the pressure in absorber 2. Valve 27 should accordingly be selected from low head loss varieties familiar to those skilled in fluid mechanics.

When an aqueous solution of an alkali carbonate is employed as the absorption liquid, it is considered desirable that the cooling of the liquid in vessel 24 be avoided so that the risk of precipitating the alkali carbonate is minimized. Heating means are shown as steam coil 28.

Ferrous carbonate is precipitated in removal vessel 24 by providing a high concentration of bicarbonate ions vis-a-vis carbonate ions. An increase of bicarbonate ion concentration could be accomplished by adding a bicarbonate to the absorption liquid or as is preferred by contacting the absorption liquid with acid gas.

In the system shown in FIGURE I, desorbed acid gas from regenerator 3 is used to raise the bicarbonate to carbonate ratio. Acid gas is conducted from top of reflux drum 15 by compressor 29 via line 31 to removal vessel 24.

To avoid scaling in removal vessel 24 by the adhesive ferrous carbonate precipitate agitator 32 stirs the liquid. Liquid and suspended ferrous carboante are then conducted via line 33 to a physical separator here shown as filter 34 with a suitable means for exhausting solids therefrom.

Leaving the filter, descaled absorption liquid is returned to the system via line 36 for passage to regenerator 3. Pressure drops across valves 27 and 22 can be employed to regulate flow relations in parallel lines 8 and 36.

In view of the availability of environment controls, vessel 24 also offers a convenient location for introducing make-up absorption liquid into the system. For this purpose line 38 is shown communicating with a source of potassium carbonate. Of course the effect on bicarbonate ion concentration has to be taken into account.

As shown in FIGURE II the gas feed may be employed to provide acid gas. This embodiment is otherwise the same as that shown in FIGURE I. Line 39 extracts a portion of the feed from line 1 and conducts it to vessel 24. After contact of acid gas with absorption liquid in vessel 24, the gas feed is conducted to the bottom of absorber 2 via line 41.

*Example I*

A solution 20 weight percent equivalent $K_2CO_3$, at 230° F., is 60% converted to $KHCO_3$ in the absorber 2 according to the following reaction:

$$K_2CO_3 + H_2O + CO_2 = 2KHCO_3$$

This percent conversion for the solution is typical for a spent solution from the absorber column of the gas treating plant, as shown in Table I. The solution from the absorber column flows to the regenerator column where it is regenerated by desorption of the absorbed carbon dioxide, the reverse of the above reaction. The solution in circulating through the equipment reacts with iron, producing ferrous carbonate.

The solubility of ferrous carbonate is less in the spent solution than in the regenerated solution. Laboratory determinations have been made on the solubility of ferrous carbonate in a potassium bicarbonate solution, a potassium carbonate solution, and two solutions that have both potassium carbonate and potassium bicarbonate present. These data are given in the table and graph of FIG. III. The graph shows that the solubility of ferrous carbonate decreases approximately directly with the percent of $K_2CO_3$ converted to $KHCO_3$.

In a plant where the ferrous carbonate is not removed, its concentration increases in time to such an extent that the solution entering the absorber is near saturated. As the solution flows from the top of the absorber downwardly, the absorption of carbon dioxide increases the bicarbonate concentration, reducing the solubility of the ferrous carbonate in the solution. Also, at the bottom of the absorber, the concentration of carbon dioxide is highest in the gas, as it is introduced into the absorber at this point, so that a greater amount of carbon dioxide is absorbed on the bottom trays. By both mechanisms, the ferrous carbonate becomes "plated out" on the bottom trays and in time these trays become plugged and the plant requires to be shut down for removal of this deposit of ferrous carbonate.

In this invention, it is proposed to cause the precipitation of the ferrous carbonate in a vessel outside the absorber to reduce the concentration of the ferrous carbonate in the system to well below the saturated condition. Doing this eliminates the trouble in the absorber caused by blocking the trays and "plugging" through deposition of ferrous carbonate.

To precipitate the ferrous carbonate, a slip stream of the spent solution is diverted to a closed vessel and the solution is carbonated by bubbling carbon dioxide through the solution. This carbonating action converts the potassium carbonate to potassium bicarbonate, with the result that an amount of ferrous carbonate is precipitated in this vessel proportionate with the degree of carbonation. The precipitate can be removed by filtration thus preventing it "plating out" in the absorber. In this example the solution in the vessel is sufficiently carbonated in that 98% of the original carbonate is converted to bicarbonate.

The $FeCO_3$ content given below is obtained from the solubility graph, assuming saturation:

TABLE II $FeCO_3$ pounds per gallon, 60% conversion _____ .00252
$FeCO_3$ pounds per gallon, 98% conversion _____ .00202

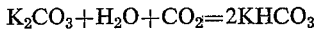

$FeCO_3$ precipitated, pounds per gallon _____ .00050

From observation in plants it is estimated that about 50 pounds of $FeCO_3$ are deposited on the bottom trays (for instance 5) of the absorber column.

To precipitate 50 pounds of $FeCO_3$ in removal vessel 24, the following number of gallons of carbonate solution saturated with $FeCO_3$ must be diverted to the removal vessel, $$50/0.0005 = 100{,}000 \text{ gallons}$$

In this example, the circulation rate is about 35,000 gallons per hour, and the solution inventory about 7,000 gallons. Without $FeCO_3$ precipitation as proposed, plugging or sufficient deposit of ferrous carbonate occurred at about 6-month intervals requiring that the plant be shut down for ferrous carbonate removal from the absorber trays at this frequency.

*Example II*

A saturated solution of 50 percent conversion at 230° F. contains .00273 pound of $FeCO_3$ per gallon of solution. This solution is carbonated to increase the conversion to 80% where the solubility of $FeCO_3$ is .00212. The amount of $FeCO_3$ precipitated is the difference of these two figures or .00061 pound per gallon of solution carbonated.

The table of FIG. III provides solubility data in $K_2CO_3$-$KHCO_3$ solutions at 230° F., as the Examples I and II were taken at this operating temperature. The following are some operating conditions for plants employing the hot potassium carbonate process.

Buck, B. O. and A. R. S. Leitch, Oil and Gas Journal, Sept. 22, 1958, pages 100–104; Temperature of solution from absorber, 230° F.; Conversion of solution from absorber, 50 to 70%.

Palo, R. O. and J. B. Armstrong, Petroleum Refiner, December 1958, pages 123–128; Temperature of solution from absorber, 230° F.; Conversion of solution from absorber, 65–75%.

Slightly different operating conditions were observed in two operating plants as given below:

Temperature of solution from absorber:
    260–280° F.
    240–270° F.
Conversion of solution from absorber:
    60–80%
    50–80%

Although temperatures other than 230° F. may be used, affecting the solubility of ferrous carbonate as shown in FIG. III (giving data for 210° F., 250° F., 270° F., and 290° F., in addition to 230° F.) it is apparent from the curves of FIG. III that the principles of the invention are equally applicable at these different temperatures.

It will be apparent to those skilled in the manufacture of gases that wide changes may be made in this process without departing from the main theme of invention defined in the claims.

What is claimed is:

1. In a process for absorbing an acid gas in an absorption zone, with the acid gas selected from a group consisting of carbon dioxide and hydrogen sulfide and mixture of the foregoing, from a gas stream, with an alkali metal carbonate solution serving as the absorption liquid, with regeneration of the carbonate absorption liquid in a regeneration zone, and with the carbonate absorption liquid having ferrous carbonate in an aqueous solution as an impurity therein; the bicarbonate concentration in the carbonate absorption liquid being less than that at which ferrous carbonate precipitates; an improvement for removing the ferrous carbonate comprising the steps of passing a portion of the carbonate absorption liquid directly from the absorption zone to a removal zone apart from the absorption zone and the regeneration zone, maintaining the temperature of the carbonate absorption liquid in the removal zone at approximately the temperature of the liquid in the absorption zone;

increasing the bicarbonate ion concentration of the carbonate absorption liquid in the removal zone to precipitate ferrous carbonate therein;

physically separating the precipitated ferrous carbonate from the carbonate absorption liquid;

passing the separated carbonate absorption liquid to the regeneration zone.

2. The process of claim 1
with regeneration of the absorption liquid including the desorption of absorbed acid gas therefrom;
passing a portion of the desorbed acid gas to the removal zone to convert carbonate to bicarbonate therein.

3. The process of claim 2
with the removal zone serially connected between the absorption zone and the regeneration zone.

4. In a process for extracting an acid gas, selected from a group consisting of carbon dioxide and hydrogen sulfide, from a gas stream,
with the process including the steps of absorbing the acid gas in an alkali metal carbonate solution by counter-current contact of the gas stream and alkali metal carbonate solution in an absorption zone;
desorbing the acid gas from the alkali metal carbonate solution in a regenerator zone;
the alkali metal carbonate solution being recycled serially through the absorption zone and the regenerator zone;
the alkali metal carbonate solution having ferrous carbonate in an aqueous solution as an impurity, the bicarbonate concentration being less than that at which ferrous carbonate precipitates; the improvement for removing the ferrous carbonate impurity comprising the steps of passing a portion of the alkali metal carbonate solution directly from the absorption zone to a removal zone apart from the absorption zone and the regenerator zone;
maintaining the temperature of the alkali metal carbonate solution in the removal zone at approximately the temperature of the liquid in the absorption zone;
increasing the bicarbonate ion concentration of the alkali metal carbonate solution in the removal zone to precipitate ferrous carbonate therein;
physically separating the precipitated ferrous carbonate from the alkali metal carbonate solution;
passing the separated alkali metal carbonate solution to the regeneration zone.

5. The process of claim 4 wherein the bicarbonate ion concentration in the removal zone is increased by bubbling an acid gas selected from the group consisting of carbon dioxide and hydrogen sulfide into the alkali metal carbonate solution, and the pressure in the removal zone is approximately equal to the pressure in the absorption zone.

6. The process of claim 5 wherein the pressure in the removal zone is at least about 50 p.s.i.g., and the temperature is about 230° F.

7. In a process for extracting carbon dioxide from a gas stream, the process including the steps of
absorbing the carbon dioxide in a carbonate liquid by counter-current contact of the gas stream and the carbonate liquid, wherein the carbonate liquid is an aqueous solution of from 6 to 14 normality of potassium carbonate, the absorption being at a pressure in excess of 100 p.s.i. and at a temperature within 20° F. of the atmospheric boiling point of the potassium carbonate, to absorb the carbon dioxide thereby converting carbonate to bicarbonate;
desorbing the carbon dioxide from the potassium carbonate in a regenerator zone;
recycling the liquid serially through the absorption zone and the regenerator zone;
the carbonate liquid having ferrous carbonate in an aqueous solution as an impurity, the bicarbonate concentration of the liquid being less than that at which ferrous carbonate precipitates;
the process further including the steps for removing ferrous carbonate from aqueous solution in the carbonate liquid; comprising passing a portion of the carbonate liquid directly from the absorption zone to a removal zone apart from the absorption zone and the regenerator zone;
maintaining the temperature of the carbonate liquid in the removal zone at approximately the temperature of the liquid in the absorption zone;
increasing the bicarbonate ion concentration of the carbonate liquid in the removal zone to precipitate ferrous carbonate therein;
physically separating the precipitated ferrous carbonate from the carbonate liquid to produce a ferrous carbonate free absorption liquid;
returning the ferrous carbonate free absorption liquid to the regenerator zone.

8. The process of claim 7
with heat added to the liquid in the removal zone to maintain its temperature at that of the liquid in the absorption zone.

9. The process of claim 8
with the pressure in the removal zone approximately equal to the pressure in the absorption zone.

10. The process of claim 9
including the step of passing a portion of the carbon dioxide desorbed from the carbonate liquid in the regenerator zone to the removal zone to convert carbonate to bicarbonate therein.

11. In a process for extracting carbon dioxide from a gas stream, the process including the steps of
absorbing the carbon dioxide in a carbonate liquid which is an aqueous solution of from 8 to 11 normality of potassium carbonate at a pressure in excess of 100 p.s.i. and at a temperature in excess of 220° F. by counter-current contact of the gas stream with the carbonate liquid, the absorption of carbon dioxide converting carbonate to bicarbonate;
desorbing the carbon dioxide from the carbonate liquid in a regenerator zone;
recycling the liquid serially through the absorption zone and the regenerator zone;
the carbonate liquid having ferrous carbonate in an aqueous solution as an impurity, the bicarbonate concentration of the liquid being less than that at which ferrous carbonate precipitates;
the process further including the steps for removing ferrous carbonate from aqueous solution in the carbonate liquid and comprising separating a slip stream of not more than 3 percent of the liquid leaving the absorption zone;

passing the slip stream to a removal zone apart from the absorption zone and the regenerator zone;

adding heat to the liquid in the removal zone to maintain its temperature above 220° F.;

maintaining the pressure in the removal zone as close as possible to the pressure in the absorption zone to minimize flash of $CO_2$ from the solution and decrease of bicarbonate ion concentrations;

increasing the bicarbonate ion concentration of the liquid in the removal zone to precipitate ferrous carbonate;

agitating the liquid in the removal zone to prevent deposition of ferrous carbonate precipitate therein;

passing the liquid to a physical separating zone;

physically separating ferrous carbonate precipitate from the liquid in the physical separating zone to produce a ferrous carbonate free absorption liquid;

passing ferrous carbonate free absorption liquid from the physical separating zone to the regenerator.

12. The process of claim 11
and passing a portion of the carbon dioxide desorbed from the liquid in the regenerator zone to the removal zone so that it will convert carbonate to bicarbonate therein.

13. The combination of claim 11
and passing a portion of the feed gas to the removal vessel so that carbon dioxide of the feed gas will convert carbonate to bicarbonate;

thereafter introducing the portion of the feed gas to the absorber.

References Cited by the Examiner
UNITED STATES PATENTS

| | | | |
|---|---|---|---|
| 2,926,751 | 3/1960 | Kohl et al. | 23—2 X |
| 2,997,366 | 8/1961 | Owens et al. | 23—3 |

OSCAR R. VERTIZ, *Primary Examiner.*

EARL C. THOMAS, *Examiner.*